United States Patent [19]

Mikkelsen

[11] Patent Number: 4,478,386
[45] Date of Patent: Oct. 23, 1984

[54] BAG FOR USE IN THE SHAPING OF LIQUID FOOD PRODUCTS OF STIMULANTS, AND A METHOD AND AN APPARATUS FOR USE IN THE PRODUCTION OF THE BAG

[75] Inventor: Henrik Mikkelsen, Naerum, Denmark

[73] Assignee: Jan Folkmar, Denmark

[21] Appl. No.: 528,158

[22] Filed: Aug. 31, 1983

[30] Foreign Application Priority Data

Sep. 10, 1982 [DK] Denmark .............................. 4061/82

[51] Int. Cl.³ ........................... B29C 1/00; B29D 3/00
[52] U.S. Cl. ...................................... 249/83; 249/119; 249/127; 249/134
[58] Field of Search ................... 249/83, 92, 119, 127, 249/134, 117; 383/38; 53/591, 594

[56] References Cited

U.S. PATENT DOCUMENTS

| | | | |
|---|---|---|---|
| 2,183,113 | 12/1939 | Bennett | 383/38 |
| 2,635,665 | 4/1953 | Ashley | 383/38 |
| 3,306,567 | 2/1967 | Frei | 249/127 |
| 3,966,166 | 6/1976 | Elliott | 249/134 |
| 4,426,002 | 1/1984 | Rez | 249/127 |

Primary Examiner—Willard E. Hoag
Attorney, Agent, or Firm—Steele, Gould & Fried

[57] ABSTRACT

A bag (1) for use in the shaping of liquid food products or stimulants consists of two plastics foils (2, 3), which are welded together in such an area of the two foils as will provide a plurality of interconnected mould cavities (4) with a common inlet (5). In the mould cavities (4) there are placed sticks (6) which are held in position by the positioning in a channel (8) having a length and cross-section corresponding to the holding part (7) of the stick (6). When the bag is filled with liquid ice cream or a similar material, the mould cavities (4) are distended three-dimensionally, and when the length of the sticks (6) is suitably dimensioned with respect to the length of the mould cavities (4), the sticks will be firmly "fixed" within the mould cavities (4). The sticks (6) are therefore placed in the middle of the ice lollies formed after freezing.

6 Claims, 11 Drawing Figures

Fig.3
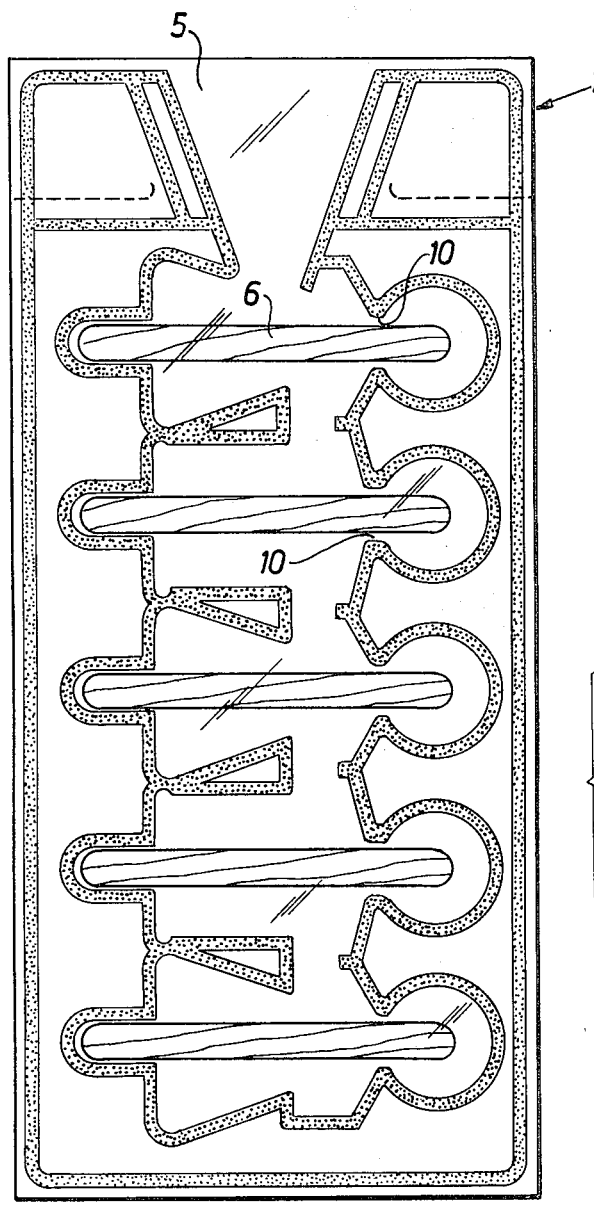
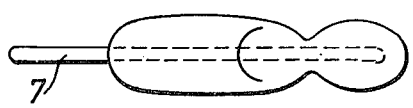
Fig.5
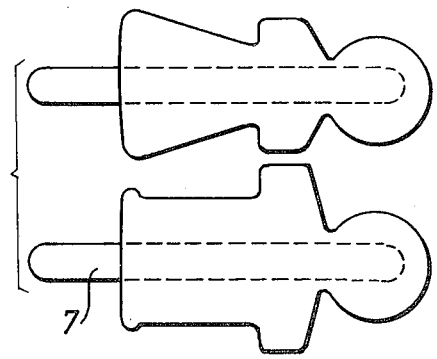
Fig.4

BAG FOR USE IN THE SHAPING OF LIQUID FOOD PRODUCTS OF STIMULANTS, AND A METHOD AND AN APPARATUS FOR USE IN THE PRODUCTION OF THE BAG

The invention relates to a bag for use in the shaping of liquid food products or stimulants, e.g. by freezing, said bag consisting of two layers of foil, preferably two plastic foils, which are partly welded together or joined in another manner to form a plurality of interconnected mould cavities with a common inlet. The invention also relates to a method and an apparatus for use in the production of a bag according to the invention.

Bags of this type have been known for a long time and have been used for the freezing of water or other liquid media to form so-called ice cubes in the mould cavities or pockets of the bag. The frozen product has been removed from the mould cavities of the bag by tearing of the usually relatively thin plastic foils.

In case of certain food products or stimulants it is advantageous to embed a holding stick in the article.

The object of the invention is to allow such embedding of sticks with a pre-determined podition in the mould cavities and thus the article both before and during moulding.

This object is achieved according to the invention by a bag of the type stated in the opening paragraph in that sticks secured by the webs of foil are positioned in the mould cavities.

When the sticks are secured by the webs of foil it is possible to guide the sticks in relation to the webs of foil so that the position of the stick in the moulded article can be determined in advance.

According to the invention, one end of the sticks may be slidably positioned in a channel which is formed by the webs of foil and has a cross-section corresponding to the sticks.

This embodiment is particularly advantageous for sticks which are to protrude a distance from the moulded article because the webs of foil can then be placed tightly around the stick while allowing some movement thereof in relation to the mould cavity during the initial part of the moulding operation where the mould cavity is distended three-dimensionally.

In a preferred embodiment of a bag according to the invention the sticks are precisely so much shorter than the mould cavities that the free end edges of the sticks engage the inner mould defining faces of the mould cavities when, after filling, these are distended.

This provides for a safe securing of the sticks during the moulding operation since the two free end edges of the sticks engage the mould defining faces of the mould cavities in the dividing plane of the mould cavity and are firmly "fixed" in the mould cavity with such a force that the pressure from the inflowing moulding mass does not damage the sticks.

According to the invention the mould cavities may have a narrowed area around the sticks between these free ends and the ends received in the channels.

This likewise provides for a two-point fixing of the stick in relation to the mould cavity so that the said securing force is additionally enhanced if the length of the stick is dimensioned as stated above with respect to the length of the mould cavity, or alternatively it allows embedding of a stick whose free end edge will be placed a distance within the moulded article.

In an embodiment which is preferred in practice, the stick is a holding stick for ice lollies, and the bag is characterized in that the channel formed by the foils has a length corresponding to the free holding part of the holding stick. This enables the production of conventional ice lollies with the holding part of the holding stick protruding from the ice mass moulded around the stick.

In still another embodiment of a bag according to the invention where the stick is a holding stick for ice lollies, the holding part of the stick may, according to the invention, protrude from the mould cavity, and the two layers of foil may be welded together around the said holding part.

This results in an even better securing of the holding stick in relation to the webs of foil or the layers of foil during the moulding operation, because outer holding means may be used for this purpose so that the welding around the holding part of the stick is effected in a subsequent welding operation.

As stated in the opening paragraph, the invention also relates to a method for the production of a bag according to the invention. The method is characterized by comprising the following steps:
(a) placing the webs of foil above each other at a distance corresponding at least to the thickness of the stick,
(b) moving the sticks in between the webs of foil and securing them positively in relation to said webs,
(c) partially joining the webs of foil.

The positive securing of the sticks with respect to the webs of foil ensures a well-defined positioning in the mould cavities, so that the subsequent partial joining will result in bags with sticks positioned in the desired manner in the mould cavities.

In a possible method according to the invention the sticks are secured at one end alone.

This enables the use of the tool serving to introduce the sticks to secure the sticks during the partial joining of the webs of foil.

Finally, according to the invention a method may be used in which the sticks are secured by a downwardly directed pressure against the upper side of the sticks and with the upper layer of foil forming an intermediary layer.

This allows the use of holding means cooperating with the joining tool to secure the sticks during the subsequent joining operation where the two layers of foil can be joined in one operation.

In an embodiment of a method according to the invention which is preferred in practice, the sticks are moved in between the webs of foil transversely to the longitudinal direction of the webs.

This allows the use of an upwardly and downwardly moving joining tool in combination with a stick feeding assembly working at right angles to this path of movement.

An apparatus according to the invention for use in the carrying out of a method for the production of bags according to the invention comprises a welding station which is arranged to weld the two webs of foil together and consists of an upwardly and downwardly moving welding piston and an underlying backing part, where the webs of foil are moved in below the welding piston by separate feed rollers and away therefrom in a partly welded state by means of common feed rollers for further treatment in a packaging station. The apparatus according to the invention is characterized by a stick supply unit disposed opposite the welding station and arranged to feed and release stick for each mould cavity in a pre-determined position therein, in response to the movements of the piston. An apparatus constructed in this manner provides for simple and therefore economical realization of the method proposed in the foregoing for the production of bags according to the invention.

In a possible embodiment of an apparatus according to the invention, the piston may be formed with recesses for resilient securing of protruding holding means to secure the sticks prior to the welding and during this operation.

Thus, it is possible to use the provided welding tool also for securing the sticks after their positioning in the mould cavities.

In still another embodiment of an apparatus according to the invention the stick supply unit has reciprocating arms which are arranged to carry the sticks to the desired, pre-determined position between the foils and to secure the sticks therein during the welding operation.

In this apparatus it is possible to use the stick supply unit also for securing the sticks in the mould cavities in an operation for the welding of the part of the webs of foil which is disposed outside the area of the holding means. The area at the holding means can be welded together in a subsequent welding operation when the holding means have been removed.

The invention will be explained more fully below with reference to the drawing, in which FIG. 1 shows a bag formed in accordance with the invention, FIG. 2 is a side view of the bag of FIG. 1, FIG. 3 shows another embodiment of a bag according to the invention, FIG. 4 shows articles produced by means of a bag according to the invention, FIG. 5 is a side view of an article of FIG. 4, FIG. 6 shows still another embodiment of a bag according to the invention.

Figure 1:
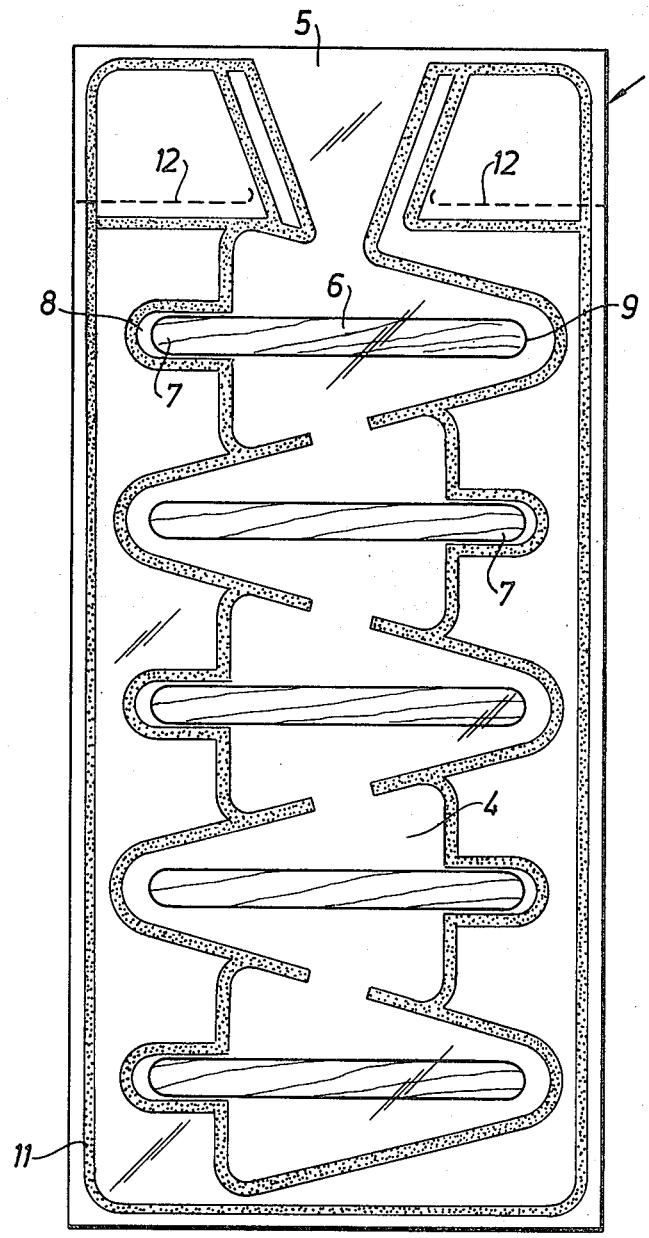
Figure 2:
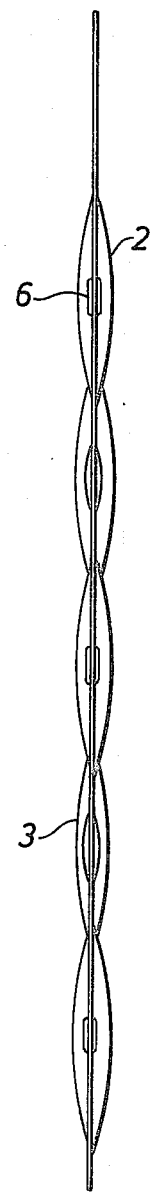

The bag shown in FIGS. 1 and 2 is generally designated by 1 and consists of two relatively thin plastics foils 2, 3, which are welded together at the hatched areas 11 in FIG. 1. The upper part of the bag is formed with two cuts or perforations 12 which extend from the rim of the bag to the inlet 5; the cuts or perforations 12 are torn after filling of the bag so that the flaps formed by this at the side of the inlet can be used for tying up the bag.

Sticks 6 are placed in the mould cavities, and these sticks have a holding part 7 slidably received in channels 8 formed by the two foils 2, 3.

The sticks have such a length that the free end edge 9 engages the end wall of the mould cavity 4 when the moulding mass has penetrated down into the mould cavities through the inlet 5 and thus has distended them. This will firmly fix the stick 6 between the end wall of the channel 8 and the front boundary of the mould cavity 4 so that the stick 6 is secured in the dividing plane of the mould cavity during and after the filling of the moulding mass.

FIG. 3 shows a possible embodiment of a bag according to the invention. This bag likewise consists of two webs of foil which are partly welded together, differing from the bag of FIG. 1 primarily in the shape of the mould cavities arranged to receive the moulding mass. Thus, between the ends of the mould cavities there are provided narrowed areas 10 serving to improve the securing of the sticks 6 in the mould cavities during and after the filling of the moulding mass.

For the purpose of illustrating the invention, FIG. 4 shows two articles produced by means of a bag according to the invention, viz. ice lollies with a holding part 7 protruding from the ice itself.

FIG. 5 is a side view of an ice lolly produced by means of a bag according to the invention.

Figure 6:
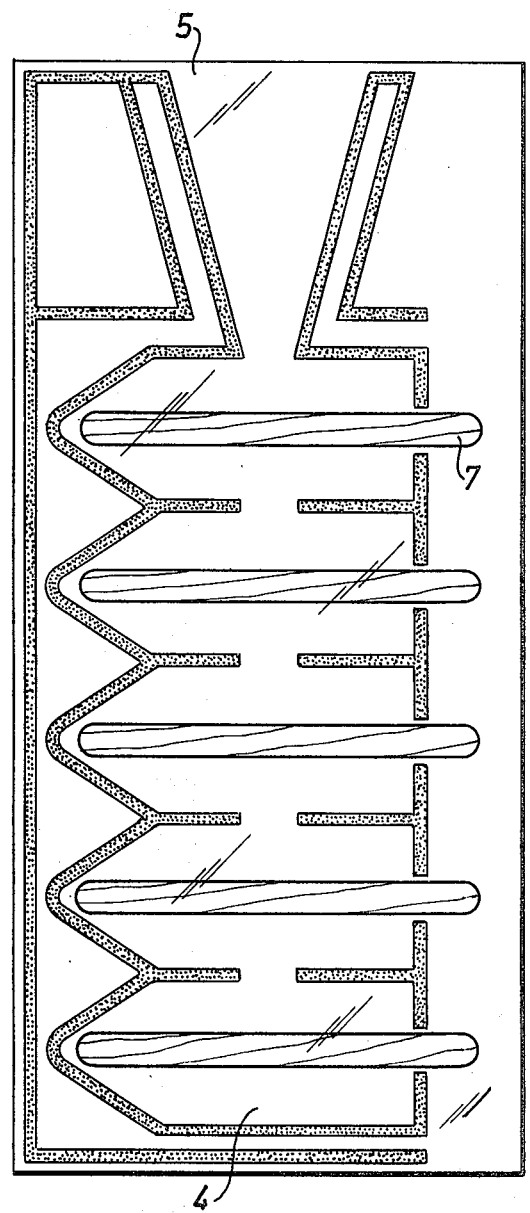

The bag shown in FIG. 6 differs from the embodiments described in the foregoing in that the holding part 7 of the stick protrudes from the mould cavities. This embodiment enables the use of combined supply and holding means, it being possible to place the holding means between the two webs of foil during the welding together of the webs of foil at the hatched area.

Figure 7:
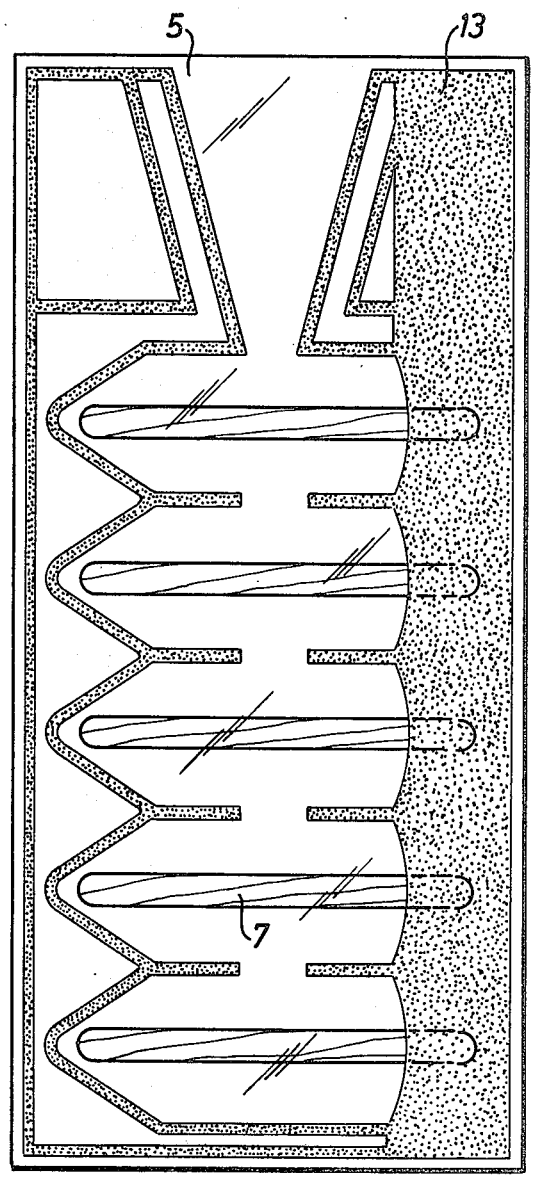
FIG. 7 shows an additional embodiment of a bag according to the invention.

FIG. 7 shows an embodiment corresponding to the one in FIG. 6, but in this embodiment the two webs of foil are welded together uninterruptedly in a band 13 at one side of the bag, said band corresponding to the holding parts. The holding part 7 of the sticks is thus fixed in a very effective manner as the band 13 provides a kind of blister package around the holding parts 7.

Figure 8:
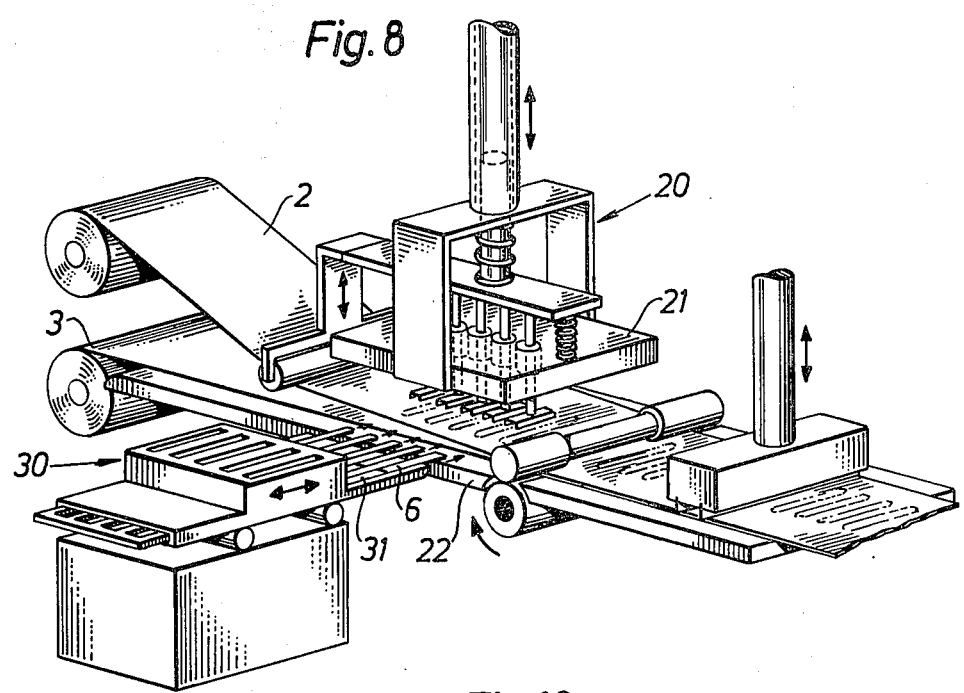
FIG. 8 shows an apparatus according to the invention, schematically and obliquely.

FIG. 8 of the drawing shows an apparatus for use in the production of a bag according to the invention. As known in the art, the apparatus consists of a set of feed rollers which, combined, are arranged to carry the two foil layers 2 and 3 below a welding station 20 in such a manner that, prior to the welding together, the two foils are disposed with a mutual spacing corresponding at least to the thickness of the sticks 6 intended to be placed in the mould cavities of the bags. Opposite the welding station 20 there is placed a stick supply unit 30 which is arranged to carry, by means of reciprocating arms 31, the sticks 6 laterally below the welding station 20 and between the spaced webs of foil 2 and 3. After release of the sticks 6 the arms 31 are returned.

Figure 9:
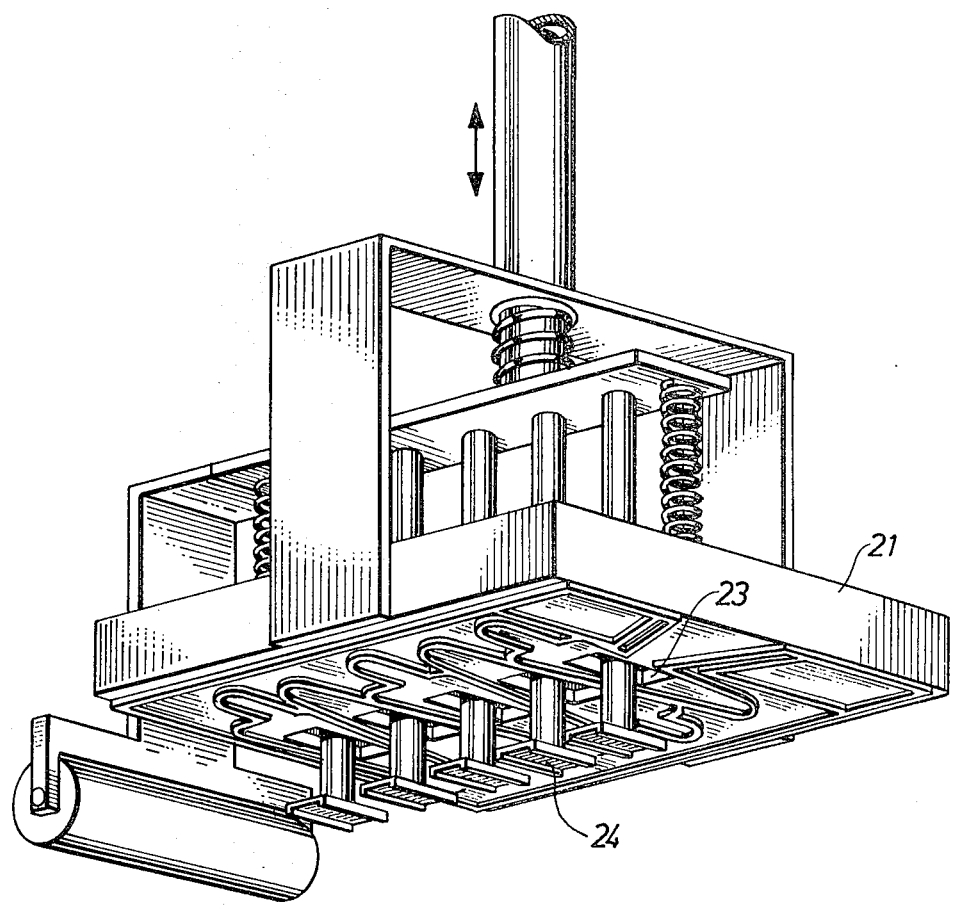
FIG. 9 shows a welding tool for the apparatus of FIG. 8.

By means of the welding piston 21 shown on a larger scale in FIG. 9, and more particularly the holding means 24 protruding elastically and downwardly from these, the sticks 6 are pressed downwardly against the backing part 22 cooperating with the welding piston 21, i.e. downwardly against the foil layer 3 resting on the backing part, upon the engagement of the holding means 24 with the top side of the upper web of foil 2. Continued downward movement of the piston 21 causes the welding tool to engage the backing part 22, and the welding together can be effected in a manner known per se.

Figure 10:
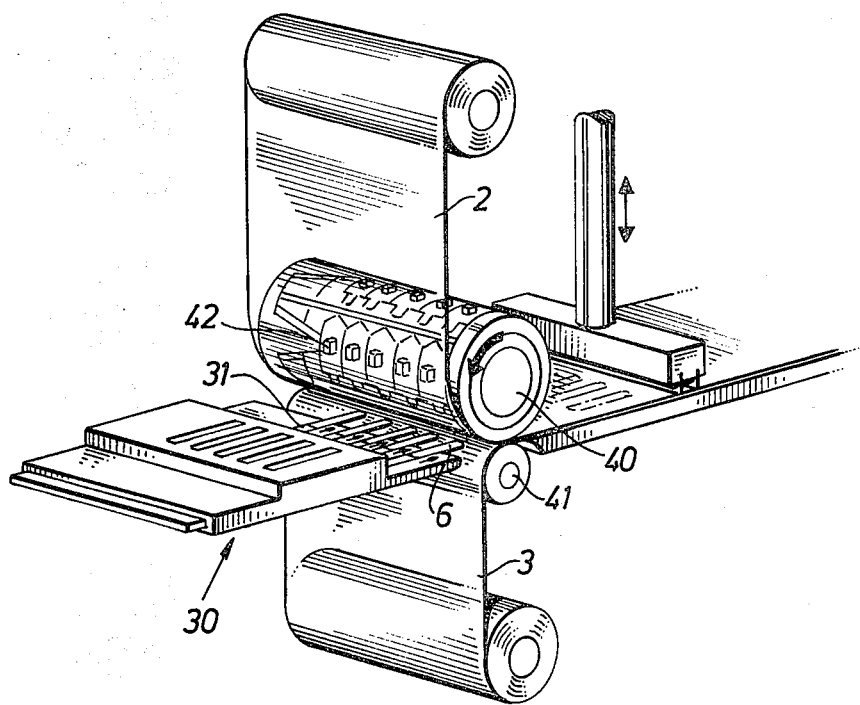
FIG. 10 shows another embodiment of an apparatus according to the invention.

FIG. 10 shows an alternative apparatus for use in the carrying out of a method according to the invention. This apparatus comprises an upwardly and downwardly moving welding tool 40 constructed as a cylinder and also arranged to rotate about the cylinder axis. Between the two webs of foil 2 and 3 the sticks 6 are moved from the stick supply unit 30 in between the welding cylinder 40 and the backing part 41 cooperating with the cylinder, in the longitudinal direction of the webs of foil. During the welding of the webs of foil 2 and 3 the sticks 6 are secured by the holding means 42 protruding radially from the welding cylinder. In fundamentally the same manner as in the apparatus shown in FIGS. 8 and 9.

Figure 11:
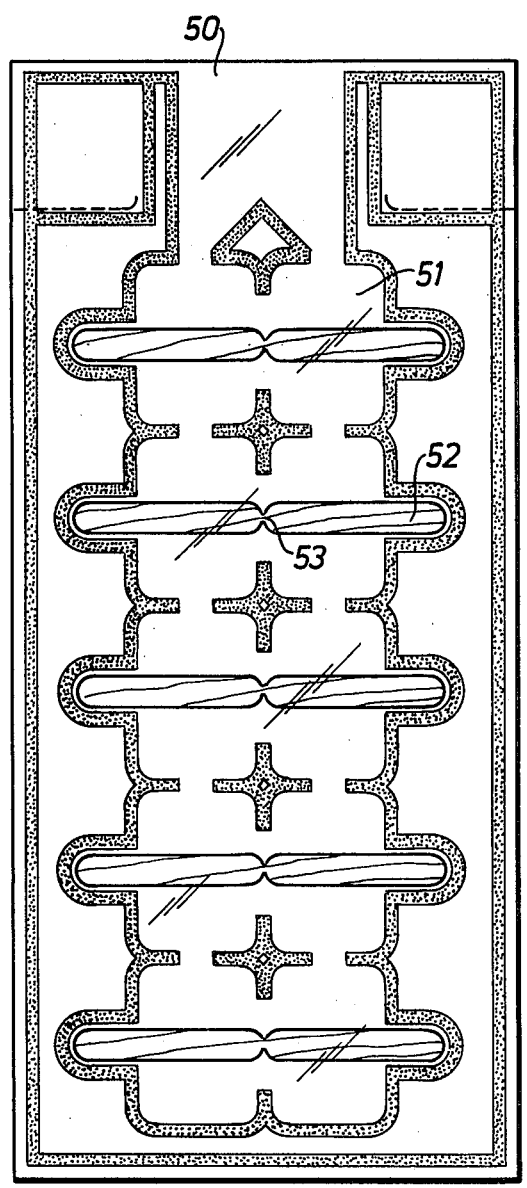
FIG. 11 shows an embodiment of a bag according to the invention.

FIG. 11 shows a possible embodiment of a bag according to the invention. This bag is characterized by the dual inlet and the mirror symmetrical arrangement of the mould cavities 51. The sticks 52 are provided with a narrowed or weakened area 53 in the plane of symmetry of the bag. Like in the embodiments described in the foregoing paragraphs, the sticks are secured by the webs of foil in channels formed therein at one end of the mould cavities. In the use of the ice lollies produced by means of the bag of FIG. 11 the sticks are broken off around the weakened area 53 and the enclosing foil is torn off.

I claim:

1. A bag for use in the shaping of liquid food products, the food products to be adhered to a plurality of sticks, comprising:
   at least two layers of foil, which are partly joined to form a plurality of interconnected mould cavities with a common inlet, said partly joined layers defining means for securing the sticks at a desired position in the mould cavities.

2. A bag as claimed in claim 1, wherein the stick is a holding stick for ice lollies, the stick having a holding part protruding from the mould cavity, and the two layers of foil are welded together around said holding part.

3. A bag as claimed in claim 1 wherein the bag has a channel which is formed by the layers of foil, for slidably receiving an end of one of the sticks, the channel having a cross-section corresponding to the sticks.

4. A bag as claimed in claim 3, wherein the mould cavities and the sticks are dimensioned such that the sticks are precisely so much shorter than the mould cavities that free end edges of the sticks engage inner said foil defining spaces of the mould cavities when the mould cavities are distended by filling.

5. A bag as claimed in claim 3, wherein the mould cavities have a narrowed area around the sticks between free ends of the sticks and ends of the sticks received in the channels.

6. A bag as claimed in claim 3, wherein the food product is to be shaped as ice lollies having protruding holding sticks, and the channel formed by the foils has a length corresponding to a free holding part of the holding stick.

* * * * *

UNITED STATES PATENT AND TRADEMARK OFFICE
CERTIFICATE OF CORRECTION

PATENT NO. : 4,478,386
DATED : October 23, 1984
INVENTOR(S) : MIKKELSEN

It is certified that error appears in the above-identified patent and that said Letters Patent is hereby corrected as shown below:

IN THE TITLE

"Food Products of Stimulants" should be --Food Products or Stimulants--.

IN THE CLAIMS

In claim 4, "said foil defining" should be between "engage" and "inner" and not after "inner".

Signed and Sealed this

Second Day of July 1985

[SEAL]

Attest:

DONALD J. QUIGG

Attesting Officer        Acting Commissioner of Patents and Trademarks